United States Patent
Chalaud et al.

(10) Patent No.: US 10,683,774 B2
(45) Date of Patent: Jun. 16, 2020

(54) OIL TANK COMPRISING AN OIL LEVEL CONTROL DEVICE

(71) Applicant: Safran Aircraft Engines, Paris (FR)

(72) Inventors: Sébastien Christophe Chalaud, Moissy-Cramayel (FR); Lise Jeanine Léonie Domecq, Moissy-Cramayel (FR); Yves Emprin, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 268 days.

(21) Appl. No.: 15/822,812

(22) Filed: Nov. 27, 2017

(65) Prior Publication Data

US 2018/0156066 A1    Jun. 7, 2018

(30) Foreign Application Priority Data

Nov. 28, 2016  (FR) ...................................... 16 61593

(51) Int. Cl.
| | |
|---|---|
| *F01D 25/18* | (2006.01) |
| *F01D 25/20* | (2006.01) |
| *F01M 11/12* | (2006.01) |
| *F16N 19/00* | (2006.01) |
| *F01D 25/14* | (2006.01) |
| *F02C 7/32* | (2006.01) |

(52) U.S. Cl.
CPC ............. *F01D 25/18* (2013.01); *F01D 25/14* (2013.01); *F01D 25/20* (2013.01); *F01M 11/12* (2013.01); *F02C 7/32* (2013.01); *F16N 19/003* (2013.01); *F05D 2250/141* (2013.01); *F05D 2250/37* (2013.01); *F16N 2210/02* (2013.01); *F16N 2250/18* (2013.01); *Y02T 50/671* (2013.01)

(58) Field of Classification Search
CPC .......... F01D 25/18; F01D 25/14; F01D 25/20; F01M 11/12; F02C 7/32; F16N 10/003; F16N 2210/02; F16N 2250/18; F05D 2250/141; F05D 2250/37; Y02T 50/671
See application file for complete search history.

(56) References Cited

U.S. PATENT DOCUMENTS

| | | | | |
|---|---|---|---|---|
| 3,741,683 A | * | 6/1973 | McTamaney | ............ G05D 9/12 417/7 |
| 3,882,967 A | * | 5/1975 | Gulla | .................... G01F 23/247 184/103.1 |
| 4,265,262 A | * | 5/1981 | Hotine | .................. G01F 23/242 137/2 |
| 4,745,893 A | * | 5/1988 | Atherton | ............... G01F 23/263 |

(Continued)

FOREIGN PATENT DOCUMENTS

| | | |
|---|---|---|
| EP | 3 018 303 A1 | 5/2016 |
| FR | 3 005 486 A1 | 11/2014 |

*Primary Examiner* — Michael A Riegelman
(74) *Attorney, Agent, or Firm* — Blank Rome LLP

(57) ABSTRACT

An oil tank for a turbine engine comprising a closed enclosure having the shape of an arc of circle adapted to receive oil, with the enclosure having a lower portion and an upper portion at a distance from each other, and an oil level control device in the enclosure, wherein the oil level control device comprises a first sensor positioned in the lower portion of the enclosure so as to control the oil level, and a second sensor separate from the first sensor and positioned in the upper portion of the enclosure so as to control the oil level.

9 Claims, 2 Drawing Sheets

(56) References Cited

U.S. PATENT DOCUMENTS

| | | | | |
|---|---|---|---|---|
| 5,046,583 | A * | 9/1991 | Sasaki | G01F 23/242 |
| | | | | 184/108 |
| 6,584,997 | B1 * | 7/2003 | Blichmann | F02D 33/003 |
| | | | | 123/198 D |
| 7,216,473 | B1 * | 5/2007 | McArthur | F01D 25/18 |
| | | | | 184/6.11 |
| 8,746,410 | B1 * | 6/2014 | Lekowicz | B63H 20/002 |
| | | | | 184/1.5 |
| 2003/0221911 | A1 * | 12/2003 | Eriksen | F16C 19/52 |
| | | | | 184/6.4 |
| 2008/0116009 | A1 * | 5/2008 | Sheridan | F01D 25/18 |
| | | | | 184/6.4 |
| 2008/0116010 | A1 * | 5/2008 | Portlock | F01D 25/18 |
| | | | | 184/6.12 |
| 2009/0107771 | A1 * | 4/2009 | Liu | F01M 11/12 |
| | | | | 184/7.4 |
| 2010/0326048 | A1 * | 12/2010 | Lozier | B64D 37/04 |
| | | | | 60/262 |
| 2011/0284328 | A1 * | 11/2011 | Brandt | F01D 25/18 |
| | | | | 184/6.11 |
| 2013/0068562 | A1 * | 3/2013 | Cornet | F01M 11/12 |
| | | | | 184/6.4 |
| 2014/0069743 | A1 * | 3/2014 | Xu | F01D 25/18 |
| | | | | 184/6.11 |
| 2014/0076661 | A1 * | 3/2014 | Xu | F16N 17/06 |
| | | | | 184/6 |
| 2015/0075132 | A1 * | 3/2015 | Kohn | B64D 29/08 |
| | | | | 60/39.08 |
| 2016/0131034 | A1 * | 5/2016 | Chilton | F01D 25/18 |
| | | | | 184/6.11 |
| 2018/0156066 | A1 * | 6/2018 | Chalaud | F01D 25/14 |
| 2018/0321073 | A1 * | 11/2018 | Cleyet | G01F 23/22 |

* cited by examiner

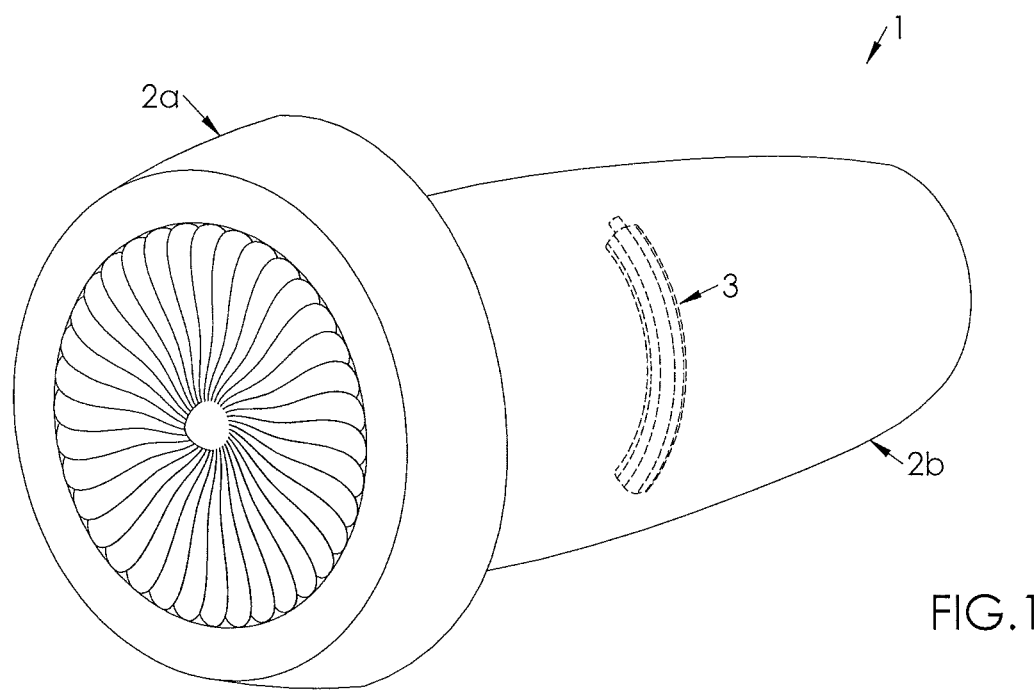
FIG.1
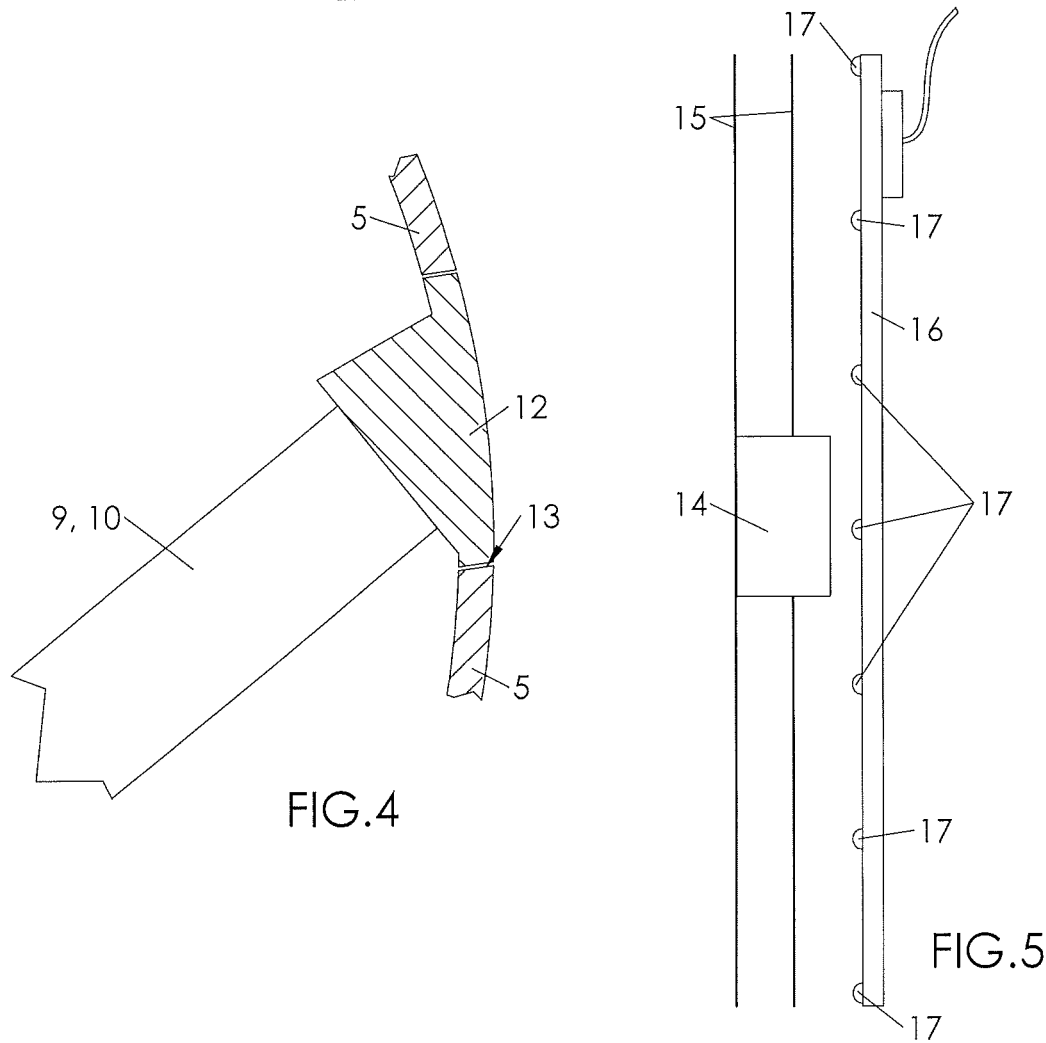
FIG.4
FIG.5

OIL TANK COMPRISING AN OIL LEVEL CONTROL DEVICE

CROSS-REFERENCE TO RELATED APPLICATIONS

This application claims the benefit of French Patent Application No. 1661593, filed Nov. 28, 2016, the contents of which is incorporated herein by reference.

TECHNICAL FIELD

The present invention relates to an oil tank for a heat engine, for instance a turbine engine.

BACKGROUND

Like all heat engines, turbine engines comprise parts which move relative to each other. To facilitate the operation of the turbine engine and prevent any damage to the parts, specifically caused by mutual friction, the parts have to be lubricated.

Lubrication is usually provided by viscous oil which covers the parts and enables a part to slide on another one, on the one hand, and the cooling, or at least no heating, of the parts, on the other hand.

The oil is contained in a tank built in a closed loop oil circuit which diffuses or projects oil onto the parts to be lubricated.

Knowing the quantity of oil (or the oil level) in the tank and thus in the lubrication system is important.

As a matter of fact oil in excess in the lubrication system may generate oil overpressure in the turbine engine, at the risk of damaging same. Similarly, a lack of oil in the lubrication system may cause an incorrect lubrication of the parts which move relative to each other and the heating of such parts which might result in the breaking of such parts or of a local fusion weld (caused by overheating).

A control device which can indicate, in real time, the quantity of oil is knowingly used to know the level of oil in the tank.

Such a control device more particularly comprises a float floating at the surface of oil and includes a magnetic element. The float moves along a magnetic card which comprises contactors which interact with the magnetic element of the float, with such card being connected to a system which converts the reaction of the contactors into information which a flight engineer or a pilot of an aircraft for instance can understand. Thus, when the oil level in the tank changes, the float opens or closes contactors and the pilot and/or the flight engineer can know the quantity of oil in the lubrication system.

Within the scope of the development of new small size turbine engines, the oil tanks have a smaller and smaller radius of curvature.

Similarly, some modifications in the architecture of turbine engines may provide for the movement of oil tanks in one area of the engine, for instance a «core» zone wherein the space is reduced, specifically the radius of curvature, relative to the initial location of the oil tanks. Modifying the oil tanks is then required, specifically by reducing the radius of curvature thereof.

The control devices which are generally substantially straight or which are slightly curved thus cannot be used in the tanks of the new turbine engines or in the modified tanks. As a matter of fact, the geometry thereof does not make it possible to mount or dismount same in the tank, in the small space around the tank when the latter is mounted in a turbine engine.

Adapting a known control device to the shape of a tank having a small radius of curvature would entail too high a cost and would not solve the above-mentioned dismounting issue.

SUMMARY

The invention more particularly aims at providing a simple, efficient and cost-effective solution to this problem.

For this purpose, the invention provides for a tank for a turbine engine, which comprises:
a closed enclosure having the shape of an arc of circle adapted to receive oil, with the enclosure having a lower portion and an upper portion at a distance from each other, and
an oil level control device in the enclosure,
characterized in that the control device comprises a first sensor positioned in the lower portion of the enclosure so as to control the oil level, and a second sensor separate from the first sensor and positioned in the upper portion of the enclosure so as to control the oil level.

The fact that both sensors are separate, in addition to easily introducing same into the enclosure, makes it possible to control the upper and lower portions of the tank only, wherein risks of oil in excess or lack of oil, respectively, exist.

According to one aspect, the enclosure comprises a middle portion separating the lower portion from the upper portion, and the first sensor is so positioned as to cover the lower portion and a part of the middle portion, and the second sensor is so positioned as to cover the upper portion and a part of the middle portion.

In this particular case, the oil level can be checked at any point of the tank. The oil consumption can thus be monitored and it can be defined as normal or abnormal.

The enclosure advantageously comprises a sealing plug enabling the introduction or the removal of the first sensor.

Such sealing plug thus makes it possible to facilitate the maintenance operations, since the access to the first sensor is direct, while limiting the oil leakage out of the tank.

According to one aspect, the first sensor is integral with the sealing plug.

This specificity still facilitates maintenance operations since the sealing plug just has to be removed to remove the first sensor from the tank.

The first sensor and the second sensor are preferably straight.

The straight shape of the sensors makes the insertion and the removal thereof easier, unlike a curved shape for which a perimeter around the sensor has to be clear. The space above the sensor only has to be clear.

The lower portion and the upper portion each advantageously represent one third of the total curved length of the enclosure.

Such dimensions make it possible to use small size sensors, specifically when the excess and the lack of oil are monitored only.

The invention also provides a turbine engine comprising an oil tank as disclosed above.

BRIEF DESCRIPTION OF THE DRAWINGS

The invention will be better understood and other details, characteristics, and advantages of the invention will appear on reading the following description given by way of non-limiting example and with reference to the accompanying drawings, in which:

FIG. 1 is a perspective view of a turbine engine comprising an oil tank according to the invention;

FIG. 4 is detailed sectional view of a sealing plug of the oil tank of the preceding Figures;

FIG. 5 is a schematic view of a sensor in an oil level control device in the tank of the preceding Figures.

DETAILED DESCRIPTION

FIG. 1 shows a turbine engine 1 comprising a fan casing 2a and an inner casing 2b defining an inner space (also called a «core» zone) wherein the pieces of equipment of the turbine engine 1 and specifically an oil tank 3 are accommodated.

The tank 3 is accommodated in a space defined outside by the inner casing 2b and inside by other elements of the turbine engine (not shown) such as the casing of a low pressure compressor, for instance. When the tank 3 is mounted in the turbine engine 1, the radius of curvature thereof is thus large and the access thereto is limited.

Figure 2:
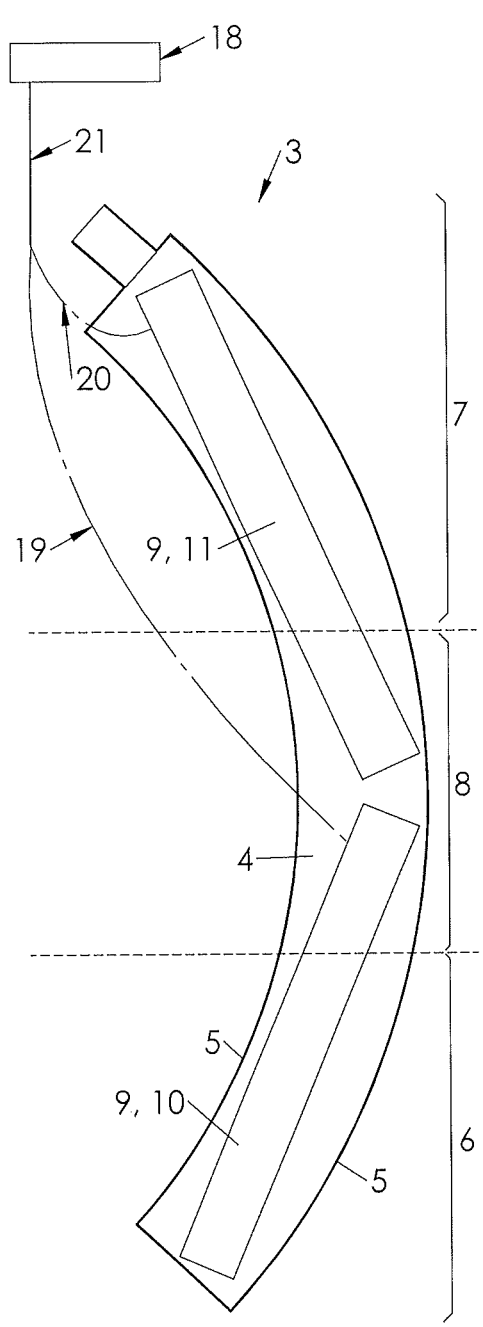
FIG. 2 is a sectional view of the tank of FIG. 1 according to a first embodiment.
Figure 3:
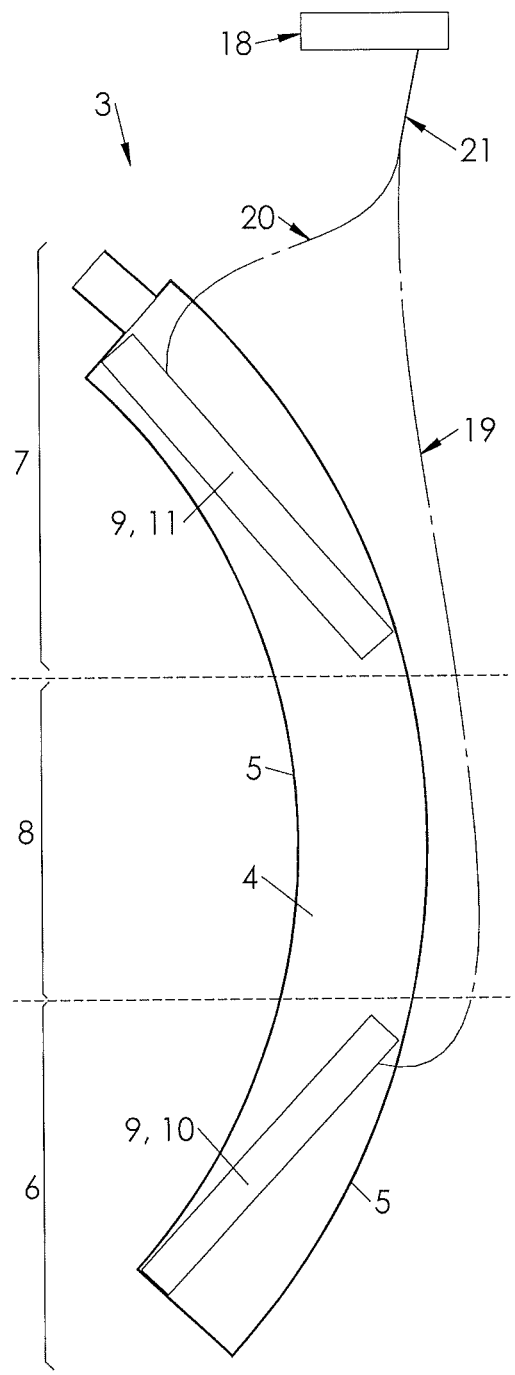
FIG. 3 is a sectional view of the tank of FIG. 1 according to a second embodiment.

The tank 3 which is shown in section in FIGS. 2 and 3 comprises:
  a closed enclosure 4 having the shape of an arc of circle, defined by walls 5 wherein oil is received, with the enclosure having a lower portion 6 and an upper portion 7 at a distance from each other, and separated by a middle portion 8, and
  an oil level control device 9 in the enclosure 4.

The lower portion 6 and the upper portion 7 each advantageously represent one third of the total curved length of the enclosure 4.

As shown in FIGS. 2 and 3, the control device 9 comprises a first sensor 10 positioned in the lower portion 6 so as to control the oil level, and a second sensor 11 separate from the first sensor 10 and positioned in the upper portion 7 of the enclosure 4 so as to control the oil level.

The sensors 10, 11 are preferably straight sensors, which are simpler to manufacture than curved sensors, specifically as regards production accuracy.

According to a first embodiment, shown in FIG. 2, both sensors 10, 11 respectively have a length greater than the height of the lower portion 6 and of the upper portion 7 of the tank 3. In this embodiment, the first sensor 10 is positioned so as to cover the lower portion 6 and a part of the middle portion 8, and the second sensor 11 is positioned so as to cover the upper portion 7 and a part of the middle portion 8.

Both sensors 10, 11 advantageously have a length substantially equal to half the total curved length of the enclosure 4. The oil level can thus be checked at any point of the tank 3. It should however be noted that the FIGS. 2 and 3 are schematic and do not show the lower, upper and middle portions 6, 7, 8 at a real scale.

According to a second embodiment, shown in FIG. 3, both sensors 10, 11 respectively have a length smaller than the height of the lower portion 6 and of the upper portion 7 of the tank 3. In this embodiment, the first sensor 10 then makes it possible to monitor the oil level in the lower portion 6 of the tank only and the second sensor 11 makes it possible to control the oil level in the upper portion 7 of the tank 3 only.

Both sensors 10, 11 advantageously have a length slightly smaller than the height of the lower and upper 6, 7 portions, i.e. slightly smaller than one third of the total curved length of the enclosure 4.

The first sensor 10 can be attached in the tank either permanently, in which case it will not be possible to change the first sensor 10 in case of failure (the whole tank 3 will then have to be replaced), or removably.

If the attachment is removable, the tank comprises a sealing plug 12 on one of its walls. The first sensor 10 can then be inserted into or removed from the enclosure 4 through an opening 13 in the wall 5 which will be plugged by the sealing plug 12 once positioned on the wall 5.

According to a first alternative solution, the first sensor 10 may be held in the enclosure 4 by stops (not shown).

According to a second alternative solution, the sensor may be integral with the sealing plug 12, as shown in FIG. 4.

When the first sensor 10 is removably attached, the tank has to be drained (i.e. some oil must be removed therefrom) until a level under the sealing plug 12 is reached, so that, when opening the sealing plug 12, oil will not flow out of the tank through the opening 13.

The second sensor 11 can be knowingly attached in the tank 3, i.e. through an access door (not shown), with the second sensor 11 thus being possibly removable.

FIG. 5 schematically shows a specific type of sensor which corresponds to the sensors 10, 11 used for checking the oil level in the tank 3. Such sensor comprises a float 14 which follows the oil level and is guided by rails 15 and comprises a magnetic element. An electromagnetic card 16 carrying contactors 17 which interact with the magnetic element of the float 14 is positioned opposite the float 14.

When the level in the tank changes, the float 14 moves along the electromagnetic card 16 and the magnetic element acts with the contactors 17. The contactors 17 then switch from an open position to a closed position, or reversely, and an electric signal circulates in the electromagnetic card 16 and is transmitted to an acquisition unit 18, distant from the tank 3, which transforms such electric signal into information legible by a pilot or a flight engineer.

The electric signal is transmitted by an electrical lead 19 associated with the first sensor 10 and an electrical lead 20 associated with the second sensor 11. Both electrical leads 19, 20 can advantageously be joined in a sheath 21.

Thus, when oil is in excess in the tank 3, the float 14 of the second sensor 11 is in a high position and the electric signal sent to the acquisition unit 18 is transformed into an alarm signal for the pilot or the flight engineer so that an intervention can be carried out on the tank 3 and the excess of oil can be removed.

Thus, when oil is lacking in the tank 3, the float 14 of the second sensor 10 is in a low position and the electric signal sent to the acquisition unit 18 is transformed into an alarm signal for the pilot or the flight engineer so that an intervention can be carried out on the tank 3 and oil can be added into the tank 3.

When the oil level in the tank 3 is correct, the float 14 of the first sensor 10 is in a high position and the float 14 of the second sensor 11 is in an intermediate position or in a low position (in all cases, in a position away from the high position thereof).

The tank 3 which has just been described has some advantages, such as:

a gain in the mass of the tank 3, in that two small size sensors can be used instead of only one large size sensor;

easy maintenance, in that the access to the first sensor 10 is available through the opening 13 and the sealing plug 12, or still a precise control of the quantity of oil in the tank 3 in that knowing the quantity of oil in the middle portion 8 of the tank 3 is not always useful since the lack (in the lower portion 6) and the excess (in the upper portion 7) of oil only are critical.

The invention claimed is:

1. An oil tank for a turbine engine, the oil tank comprising:
    a closed enclosure having the shape of an arc of a circle adapted to receive oil, with the enclosure having a lower portion and an upper portion at a distance from each other; and
    an oil level control device in the closed enclosure, wherein the oil level control device comprises:
        a first sensor positioned in the lower portion of the enclosure so as to control the oil level, wherein the first sensor includes:
            a first magnet;
            a first float attached to the first magnet;
            a first rail configured to guide the first float; and
            a first electromagnetic card that includes first contactors configured to switch between an open position and a closed position based on a position of the first magnet; and
        a second sensor separate from the first sensor and positioned in the upper portion of the enclosure so as to control the oil level, wherein the second sensor includes:
            a second magnet;
            a second float attached to the second magnet;
            a second rail configured to guide the second float; and
            a second electromagnetic card that includes second contactors configured to switch between an open position and a closed position based on a position of the second magnet.

2. The oil tank of claim 1, wherein the enclosure comprises a middle portion separating the lower portion from the upper portion, and wherein the first sensor is positioned so as to cover the lower portion and a part of the middle portion, and the second sensor is positioned so as to cover the upper portion and a part of the middle portion.

3. The oil tank of claim 1, wherein the enclosure comprises a sealing plug enabling at least one of the introduction and the removal of the first sensor.

4. The oil tank of claim 3, wherein the first sensor is integral with the sealing plug.

5. The oil tank of claim 1, wherein the first sensor and the second sensor are straight.

6. The oil tank of claim 1, wherein the upper portion and the lower portion each represent one-third of a total curved length of the enclosure.

7. A turbine engine comprising the oil tank of claim 1.

8. The oil tank of claim 1, wherein the first rail and the second rail are straight, and wherein the upper portion of the enclosure and the lower portion of the enclosure are curved.

9. The oil tank of claim 8, wherein the first rail and the second rail are not parallel.

* * * * *